(12) United States Patent
Tsukamoto et al.

(10) Patent No.: US 7,523,476 B2
(45) Date of Patent: Apr. 21, 2009

(54) DIGITAL/ANALOGUE TV RECEIVER THAT RENEWS A CHANNEL MAP USING EVENT INFORMATION AND VIRTUAL CHANNEL TABLES

(75) Inventors: Keisuke Tsukamoto, Daito (JP); Toshihiro Takagi, Daito (JP); Yasuhiro Inui, Daito (JP); Kazuhide Ishihara, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1125 days.

(21) Appl. No.: 10/340,846

(22) Filed: Jan. 13, 2003

(65) Prior Publication Data

US 2003/0163812 A1      Aug. 28, 2003

(30) Foreign Application Priority Data

Jan. 11, 2002   (JP) .............................. 2002-005273

(51) Int. Cl.
*G06F 3/00* (2006.01)
*G06F 13/00* (2006.01)
*H04N 5/445* (2006.01)

(52) U.S. Cl. ......................................... 725/39; 725/54

(58) Field of Classification Search ................. 725/100, 725/116, 54, 70, 39; 370/468, 477
See application file for complete search history.

(56) References Cited

U.S. PATENT DOCUMENTS 6,442,756 B1 *   8/2002   Durden et al. ................ 725/50
6,775,843 B1 *   8/2004   McDermott .................. 725/151
7,100,189 B2 *   8/2006   Kim ............................ 725/100
2003/0067943 A1 *   4/2003   Arsenault et al. ........... 370/468
2003/0078687 A1 *   4/2003   du Breuil ..................... 700/94
2005/0193413 A1 *   9/2005   Ellis et al. .................... 725/45

FOREIGN PATENT DOCUMENTS

JP      2001-086425      3/2001
JP      2001-136495      5/2001
WO      WO 01/05157 A2   1/2001

OTHER PUBLICATIONS

Japanese Office Action dated Nov. 7, 2006 with English translation (Two (2) Pages).

* cited by examiner

*Primary Examiner*—Vivek Srivastava
*Assistant Examiner*—Mushfikh Alam
(74) *Attorney, Agent, or Firm*—Crowell & Moring LLP

(57) ABSTRACT

A digital/analogue TV receiver having a function for displaying an EGP screen comprises a controller for displaying the EPG (electric program guide) screen including channels and TV program information on a display apparatus, and a memory for storing a channel map memorizing the TV program information correspondingly to the channels. The controller renews the channel map stored in the memory with using VCT (virtual channel table) information and EIT (event information table) information which are delivered with the TV broadcasting signals while image signals of a TV program is outputted to the display apparatus. The controller uses the TV program information memorized in the channel map stored in the memory when the EPG screen is displayed on the display apparatus.

8 Claims, 7 Drawing Sheets

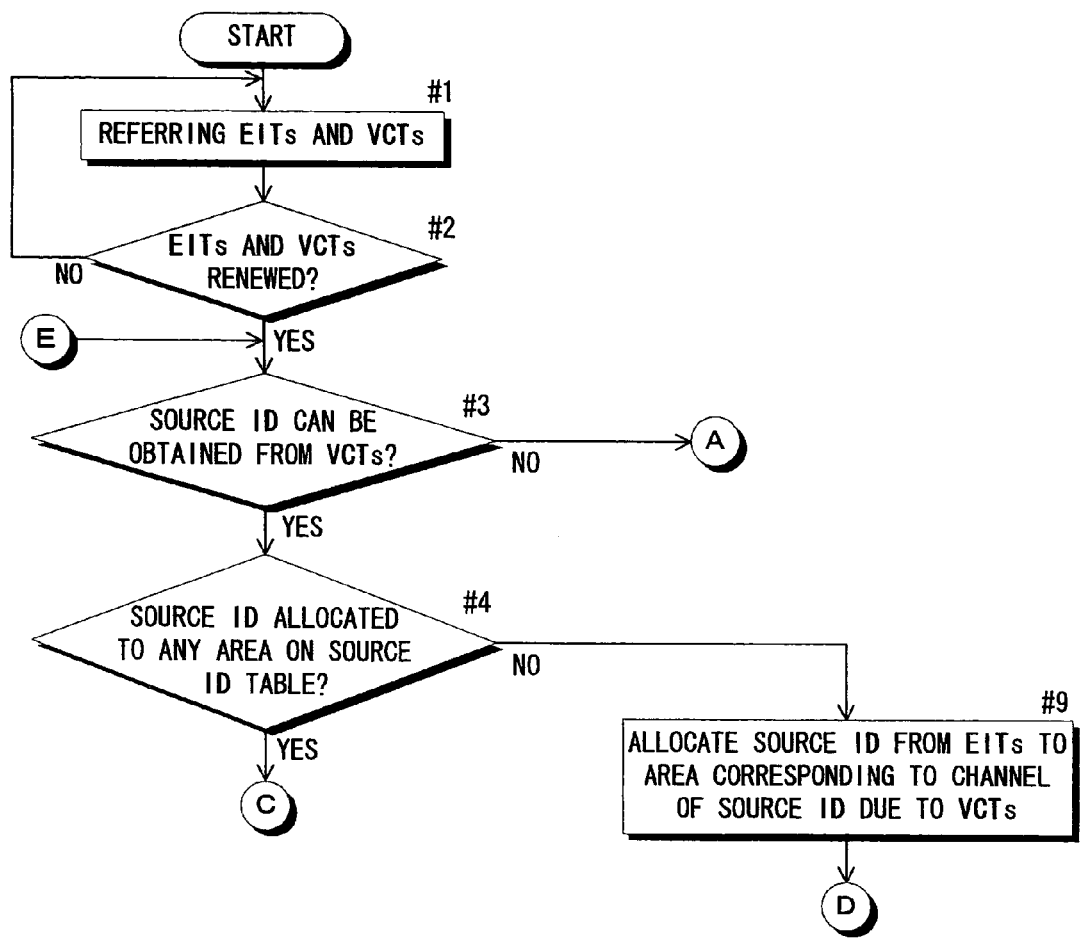

DIGITAL/ANALOGUE TV RECEIVER THAT RENEWS A CHANNEL MAP USING EVENT INFORMATION AND VIRTUAL CHANNEL TABLES

BACKGROUND OF THE INVENTION

1. Field of the Invention

The present invention relates to a digital/analogue TV (television) receiver having an EPG (electric program guide) screen display function, by which electric information of TV programs delivered within TV broadcasting signals are extracted and the EPG screen including TV program guide such as channels and contents of the TV programs are displayed.

2. Description of the Related Art

In recent years, digital TV broadcast is quickly popularized owing to progression of digital technology. In the digital TV broadcast, a plurality of TV programs is delivered in a single frequency band. Image signals and sound signals of the TV programs are encoded by compression owing to digital data compression technology, and the encoded signals are time shared and multiplexed. Subsequently, the time shared and multiplexed signals are modulated to high frequency radio waves in a predetermined frequency band, and delivered as the TV broadcasting signals. In the digital TV broadcast, the electric information of the TV programs including the channel information of the TV programs are delivered with the image signals and the sound signals of the TV programs at a predetermined interval by time sharing and multiplexing them.

In the digital TV broadcast, the TV broadcasting signals in the predetermined frequency band, which is formed by time sharing and multiplexing a plurality of TV broadcasting signals of the TV programs, is called "physical channel", and each TV broadcasting signal of the TV program, which is to be multiplexed in the frequency band, is called "sub-channel".

In a TV receiver for receiving the digital TV broadcasting signals, when a user selects a channel (physical channel and sub-channel) of a TV program which he wishes to see by operating a channel changer, the high frequency radio waves in the predetermined frequency band corresponding to the physical channel are received. By decoding the received radio waves, a signal called "transport stream signal" can be obtained, in which the encoded image signals and sound signals of the TV programs and the electric information of the TV programs are time shared and multiplexed.

The TV receiver extracts and separates the image signal and the sound signal of the TV program corresponding to the sub-channel from the transport stream signal. Subsequently, the TV receiver decodes the image signal and the sound signal to the states of them before the compression, and outputs the decoded image signal and sound signal to a display apparatus. The TV receiver further has a function to extract the electric information of the TV programs from the transport stream signal, to form the electric program guide (EPG) consisting of titles, channels, broadcast times and so on of the TV programs, and to display the EPG screen on the display apparatus. The displaying of the EPG screen on the display apparatus is selected by operating the channel changer.

In North America, the digital TV broadcast called ATSC (advanced television system committee) is delivered. The ATSC broadcast delivers information called PSIP (program and system information protocol) including various data with respect to the TV broadcast multiplexed with the image signals and the sound signals of the TV programs on air in each physical channel. The PSIP further includes electric information of TV programs called VCT (virtual cannel table) and EIT (event information table).

The VCT relates to information showing a relation between a cannel number and a source ID of a TV program on air, which includes channel number information and a source ID corresponding to a sub-channel of the TV program on air. The EIT relates to information showing a relation between TV program information and a source ID of a TV program on air or scheduled, which includes TV program information such as a title, start and end times of the TV program and the source ID.

In the conventional TV receiver for receiving the ATSC broadcast, when the user selects to display the EPG screen by operating the channel changer, an EPG screen 70, for example, shown in FIG. 9 is displayed on the display apparatus. On the EPG screen 70, a plurality of channel grids 71 shows channel numbers of the TV programs, and a plurality of program grids 72 disposed at right side of the channel grids 71 shows titles of the TV programs which will be come on the air on the channel. Start times of the TV programs are shown above the program grids 72. On the EPG screen 70, the TV programs are shown correspondingly to the channels and the start times.

The EPG screen 70 can be scrolled above and below by operating the channel changer so as to show other channels. In FIG. 9, the channel grids 71 corresponds to the channels 34-1 to 50-2. When any one of the channel grids 71 is selected by operating the channel changer, the TV broadcasting signals corresponding to the selected channel is tuned, so that an image of a TV program on the channel is appeared on the display apparatus. When an EXIT grid 76 of the EPG screen 70 is selected, the EPG screen is disappeared.

For showing the RPG screen 70, it is necessary that the titles and the start times of the TV programs are corresponded to the channels. As mentioned above, the EIT includes the TV program information such as the title and the start and end times of the TV program and the source ID, but includes no channel number information. On the other hand, the VCT includes the channel number information and the source ID corresponding to the TV program, but includes no TV program information such as the title and the start and end times. Thus, the correspondence of the title and the start time of the TV program with the channel is based on the source ID commonly included in the EIT and the VCT.

A conventional apparatus, for example, shown in Publication Gazette of Japanese Patent Application 2001-86425 takes a table including the channel number information and a table including event information, and supplies a channel list corresponding to the time of the events to the users, with respect to displaying the TV program information of the digital TV broadcast. Another apparatus, for example, shown in Publication Gazette of Japanese Patent Application 2001-136495 can display the information of local events in the EPG of the digital TV broadcast in detail, and can store and transmit the program data.

In the above-mentioned conventional TV receivers, the TV broadcasting signals of all the physical cannels are serially tuned and received, after the operation for displaying the EPG screen. Subsequently, the VCTs and the EITs are extracted from the TV broadcasting signals of each physical channel, and the titles and the start times of the TV programs are corresponded to the channels with using the source IDs commonly included in the EITs and the VCTs. Therefore, it takes a long time after operating the EPG screen displaying for forming and displaying the completed EPG screen on which the TV program information with respect to all of the physical channels are shown.

Furthermore, when the operation for displaying the EPG screen is started, another operation such as for selecting the TV channel cannot be operated until the EPG screen is displayed. Thus, the user has no alternative but to wait until the EPG screen is displayed, so that the user feels annoyance or discomfort. Such the disadvantage cannot be solved even when the technologies shown in the above-mentioned publication gazettes are applied.

SUMMARY OF THE INVENTION

An object of the present invention is to provide a digital/analogue TV receiver by which the EPG screen is quickly displayed responding to the operation for displaying the EPG screen so that the user can see the TV program information soon and can operate another operation such as the selection of the channel.

A digital/analogue TV receiver having a function for displaying an EPG (electric program guide) screen in accordance with an aspect of the present invention comprises a receiver, a decoder, a controller, an operation device and a memory. The receiver receives ATSC (advanced television systems committee) broadcasting signals delivered with VCT (virtual channel table) information showing relations between channels for broadcasting TV programs and source IDs which are inherently added to respective of the channels, and EIT (event information table) information showing relations between TV program information of respective TV programs and the source IDs. The decoder reproduces image signals of the TV programs from the ATSC broadcasting signals received by the receiver, outputs the image signals to a display apparatus which is connected to the TV receiver, and extracts the VCT information and the EIT information from the ATSC broadcasting signals. The controller forms an EPG screen including at least channels and TV program information of the TV programs with using the VCT information and the EIT information, and displays the EPG screen on the display apparatus. The operation device is used for selecting a TV program to be seen, for displaying the selected TV program on the display apparatus, and for displaying the EPG screen on the display apparatus. The memory stores a cannel map which memorizes the TV program information correspondingly to the channels. The controller obtains the EIT information and the VCT information from the decoder, renews the TV program information stored in the memory with using the EIT information and the VCT information, and displays the EPG screen on the display apparatus.

By such a configuration, the TV program information obtained from the EIT information delivered from a TV station is memorized in the channel map corresponding to the channel. The EPG screen is formed and renewed with using the TV program information memorized in the channel map, and displayed on the display apparatus. Thus, there is no need to tune the broadcasting TV signals on respective channels serially, and to obtain the EIT information and the VCT information of respective channels for forming the EPG screen, so that the EPG screen can be displayed on the display apparatus quickly. Thus, the user can see the EPG screen soon, and can operate next operation such as the selection of the channel with no waiting.

BRIEF DESCRIPTION OF THE DRAWINGS

FIGS. 8A to 8C are flowcharts for showing the operation of the digital/analogue TV receiver.

DETAILED DESCRIPTION OF THE EMBODIMENT

Figure 1:
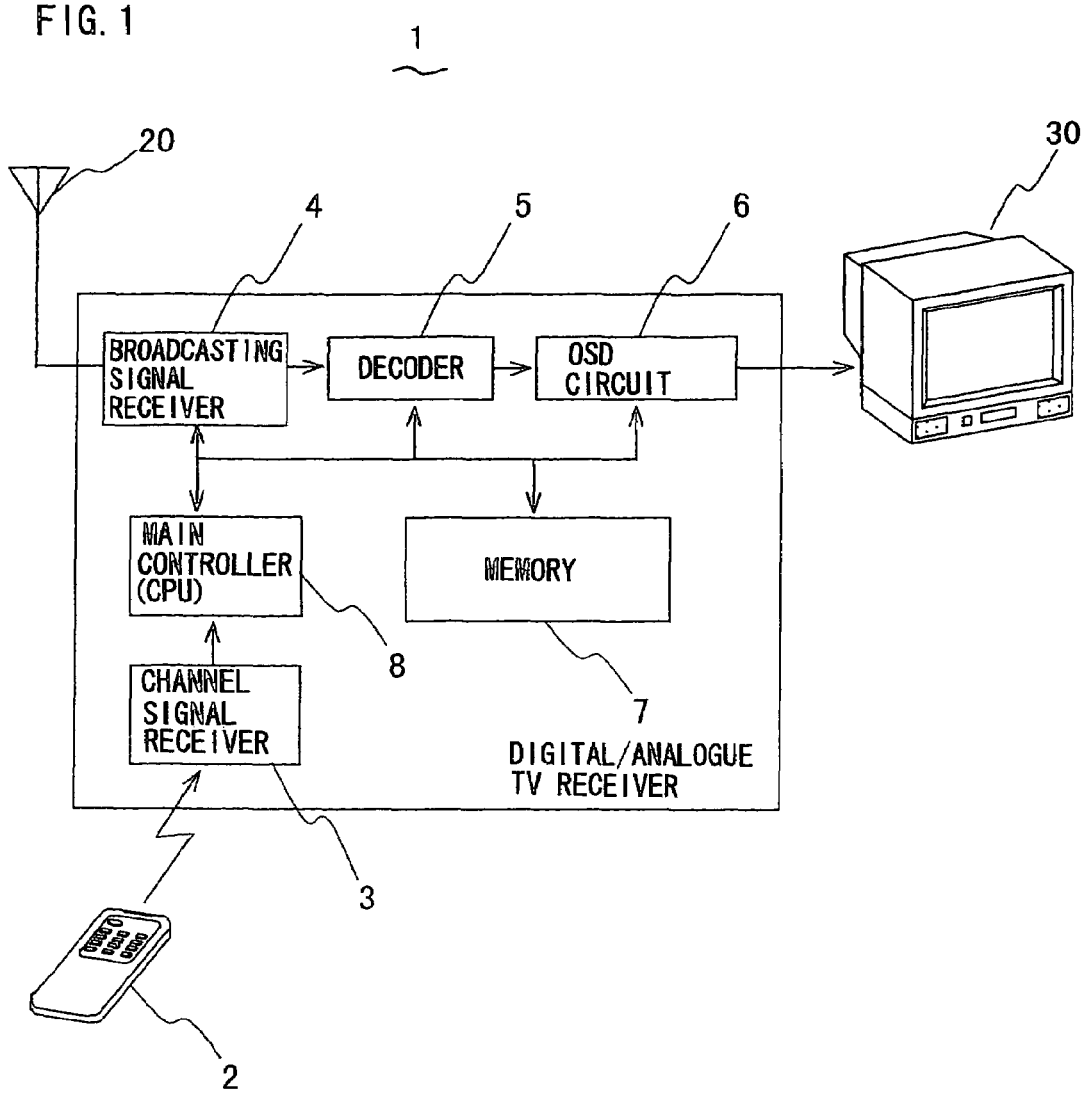
FIG. 1 is a block diagram for showing a configuration of an embodiment of a digital/analogue TV receiver in accordance with the present invention.

An embodiment of a digital/analogue TV receiver in accordance with the present invention is described. FIG. 1 is a block diagram of the digital/analogue TV receiver 1 (hereinafter, abbreviated as TV receiver 1). The TV receiver 1 is connected to an antenna 20 for receiving TV broadcasting signals which are high frequency radio waves respectively having a predetermined frequency and transmitted from TV stations. A display apparatus 30 is connected to the TV receiver 1 so as to display an image of a TV program and to output a sound.

The TV receiver 1 receives not only ATSC broadcasting signals but also other analogous broadcasting signals which are delivered from the TV stations through the antenna 20, reproduces image signals and sound signals from the TV broadcasting signals and outputs the image signals and the sound signals to the display apparatus 30. The TV receiver 1 further has a function for forming an EPG (electric program guide) including titles, channels, start and end times of TV programs with using VCTs (virtual channel tables) and EITs (event information tables) included in the ATSC broadcasting signals, and for displaying the EPG on the display apparatus 30.

The TV receiver 1 is configured by a channel changer 2, a channel signal receiver 3, a broadcasting signal receiver 4, a decoder 5, an OSD (on screen demand) circuit 6, a memory 7 and a main controller 8.

The channel changer 2 is a remote control device used by a user for selecting a channel of a TV program, for displaying the EPG screen, and so on. The channel changer 2 transmits wireless signals such as infrared ray signals corresponding to the operation by the user. The channel signal receiver 3 receives the wireless signals from the channel changer 2, and transforms the wireless signals to the corresponding control signals. The control signals are outputted to the main controller 8.

The broadcasting signal receiver 4 tunes a receiving frequency thereof to a predetermined frequency corresponding to a channel (physical channel in the ATSC broadcast) selected by the user through the channel changer 2, and receives TV broadcasting signals on the selected channel through the antenna 20.

When a channel in the ATSC broadcast is selected by the user through the channel changer 2, the decoder 5 decodes the TV broadcasting signals received by the broadcasting signal receiver 4, and forms transport stream signals in which compressed and encoded digital image signals and sound signals of a plurality of TV programs and signals of the EPG are time shared and multiplexed. Subsequently, the decoder 5 extracts and separates the image signals and the sound signals of the selected TV program from the transport stream signals. The decoder 5 decodes the extracted image signals and sound signals to the states of them before the encoding owing to the compression. The decoded image signals and sound signals are outputted to the display apparatus 30. The decoder 5 further extracts the VCT information and the EIT information from the transport stream signals, and outputs the extracted VCT information and EIT information to the main controller 8.

When a channel of analogous broadcasting signal is selected by the user through the channel changer 2, the decoder 5 decodes the TV broadcasting signals received by the broadcasting signal receiver 4, and reproduce the image signals and the sound signals of the selected TV program on the selected channel. The reproduced image signals and sound signals are outputted to the display apparatus 30.

The OSD circuit 6 superimposes predetermined on screen display data such as the channel number and the EPG screen on the image signals outputted from the decoder 5. Thus, the image of the on screen data is superimposed on the image of the TV program on the display apparatus 30.

The memory 7 stores a channel map which is used for memorizing the TV program information such as the titles and the start and end times of the TV programs in the ATSC broadcast correspondingly to the channels of the TV programs. The memory 7 is configured by, for example, an EEPROM, so that the channel map stored in the memory 7 is saved when the electric power is shut down and can be utilized just after the electric power is activated.

Figure 2:
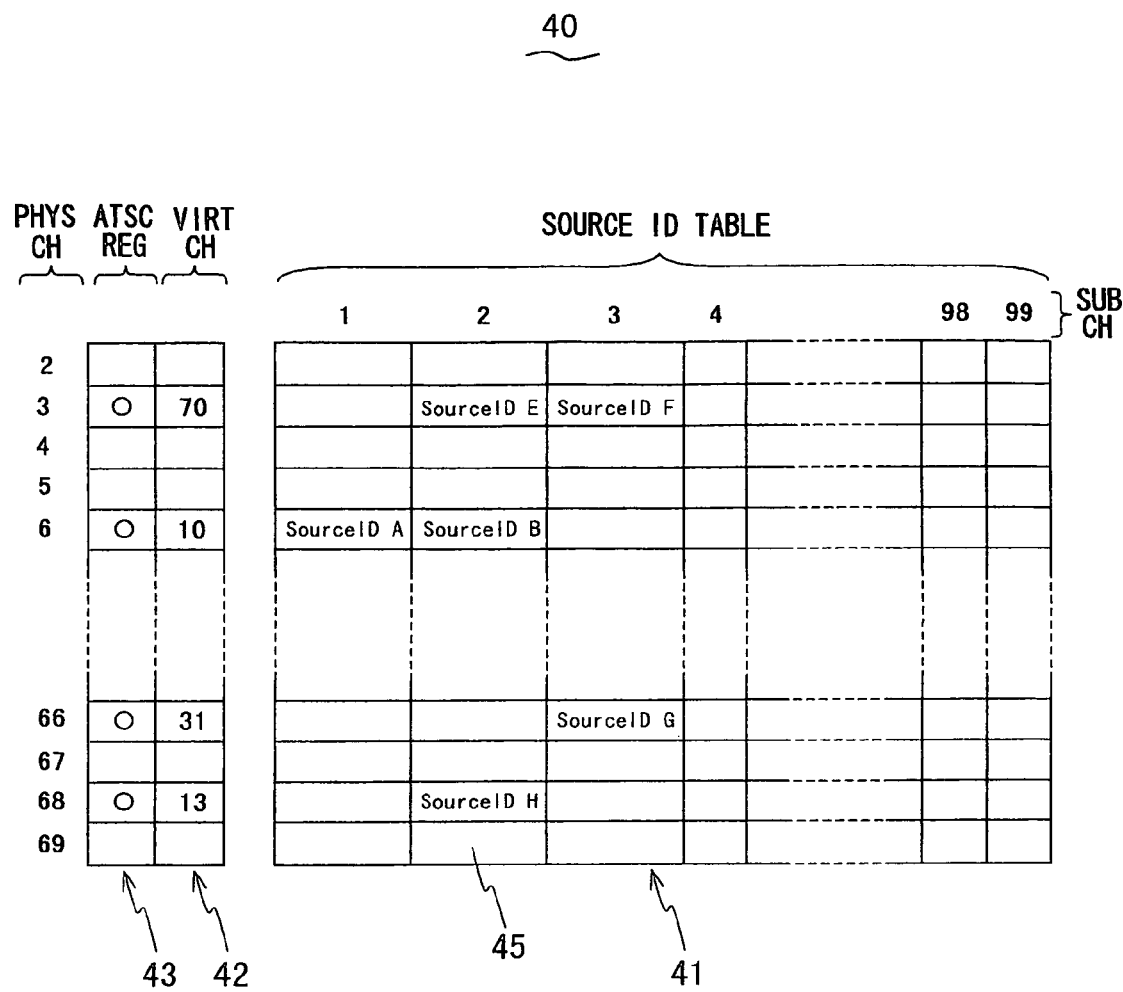
FIG. 2 is a drawing for showing an example of a channel map used in the digital/analogue TV receiver.

FIG. 2 shows an example of the channel map stored in the memory 7. The channel map is configured by a source ID table 41, a virtual channel table (VIRT CH) 42 and an ATSC registration table (ATSC REG) 43. The source ID table 41 has a plurality of memory areas 45 of a matrix of physical channels designated by numerals "2" to "69" and sub-channels designated by numerals "1" to "99". A source ID obtained from the EITs and the VCTs is allocated to an area of the memory areas 45. The TV program information of the EITs from which the source ID is obtained is further memorized in the memory 7. In the example shown in FIG. 2, a source ID "E" is allocated in a memory area corresponding to the matrix of the physical channel "3" and the sub-channel "2". The TV program information of the EITs from which the source ID "E" is obtained is memorized in the memory area. The same can be applied to other memory areas.

In an initial state of the TV receiver 1 when it is shipped, no source ID is allocated in each memory area 45 of the source ID table 41, and no TV program information is memorized in each memory area 45. Virtual channel numbers which will be recognized and used by the user are memorized in the virtual channel table 42 corresponding to the physical channels. Flags are hoisted at positions on the ATSC registration table 43 with respect to the physical channels which are actually used in the ATSC broadcast.

When a channel in the ATSC broadcast is selected, the main controller 8 controls the broadcasting signal receiver 4 so as to receive the TV broadcasting signals in the selected physical channel corresponding to a control signal from the channel signal receiver 3. Furthermore, the main controller 8 controls the decoder 5 so as to extracts and separates the image signals and the sound signals of the selected sub-channel for decoding and reproducing the image signals and the sound signals.

The main controller 8 analyzes the EITs and the VCTs extracted by the decoder 5 and allocates the source IDs obtained from the EITs to the channel map correspondingly to the channels. Furthermore, the main controller 8 memorizes the TV program information obtained from the EITs in the channel map correspondingly to the channels. The main controller 8 executes the allocation of the source IDs and the memorizing of the TV program information while the ATSC broadcasting signals are received, so that the channel map stored in the memory 7 is renewed.

When a channel of the analogous broadcast is selected, the main controller 8 controls the broadcasting signal receiver 4 so as to receive the TV broadcasting signals of the selected channel corresponding to a control signal from the channel signal receiver 3. Furthermore, the main controller 8 controls the decoder 5 so as to decode and reproduce the image signals and the sound signals.

When the user operated the channel changer to display the EPG screen, the main controller 8 forms an image of the EPG screen with using the TV program information of the channel map stored in the memory 7 corresponding to a control signal from the channel signal receiver 3. Signals of the image are outputted to the OSD circuit 6. Thus, the EPG screen is displayed on the display apparatus 30.

Subsequently, a method for allocating the source IDs on the channel map is described with reference to FIGS. 3A to 3E and 4 to 7. The allocation of the source IDs on the channel map is executed so that the source IDs are allocated to the memory areas 45 of the source ID table 41 by following two rules. When a source ID can be obtained from both of the EITs and the VCTs, the source ID is allocated at a predetermined area of the memory areas 45 corresponding to a channel. The channel is further corresponded to the source ID in the VCTs. When a source ID obtained from the EITs cannot be obtained from the VCTs, and when the source ID is not allocated to any memory area 45, the source ID is allocated to a memory area 45 corresponding to a channel having the smallest number among the channels to which no source ID is allocated.

Figure 3A:
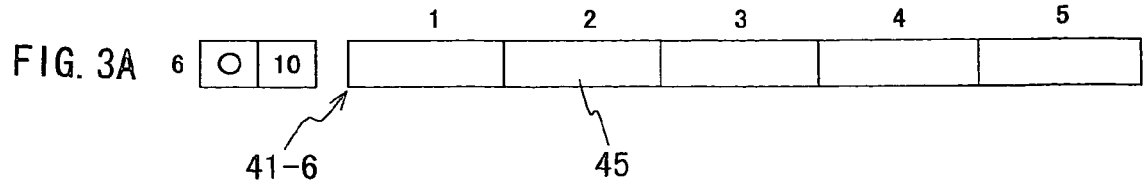
FIG. 3 is a drawing for showing examples of sharing of source IDs on the channel map in the digital/analogue TV receiver.
Figure 4:
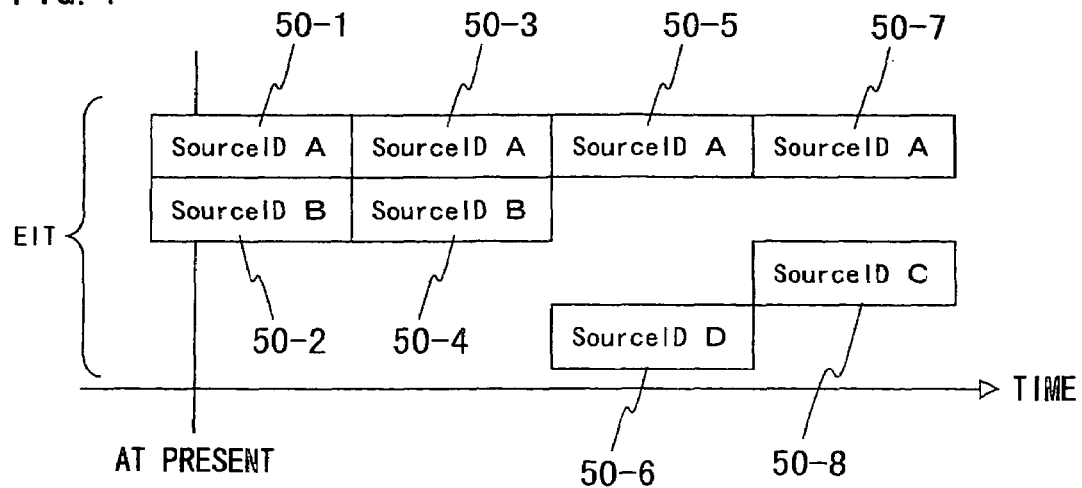
FIG. 4 is a drawing for showing examples of EITs which are received by the digital/analogue TV receiver.

As shown in FIG. 3A, it is assumed that no source ID is allocated to the memory areas 45 on a source ID table 41-6 which corresponds to a virtual channel 10 (physical channel 6). Under such a state, eight EITs 50-1 to 50-8 are obtained at a time while the ATSC broadcasting signals of the physical channel 6 are received, as shown in FIG. 4. The EITs 50-1 to 50-8 respectively include different TV program information such as a title and start and end times of a TV program. The EITs 50-1 and 50-2 respectively relate to the TV program information which is on air at present. Source ID "A" is recorded in the EITs 50-1, 50-3, 50-5 and 50-7. Source ID "B" is recorded in the EITs 50-2 and 50-4. Source ID "D" is recorded in the EIT 50-6. Source ID "C" is recorded in the EIT 50-8.

Figure 5:
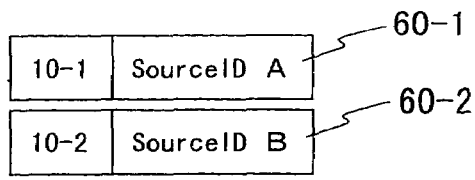
FIG. 5 is a drawing for showing examples of VCTs which are received by the digital/analogue TV receiver.

Simultaneously, two VCTs 60-1 and 60-2 are obtained, as shown in FIG. 5. In the VCT 60-1, it is recorded that a channel 10-1 (virtual channel "10" and sub-channel "1") corresponds to the source ID "A". In the VCT 60-2, it is recorded that a channel 10-2 (virtual channel "10" and sub-channel "2") corresponds to the source ID "B".

Figure 3B:
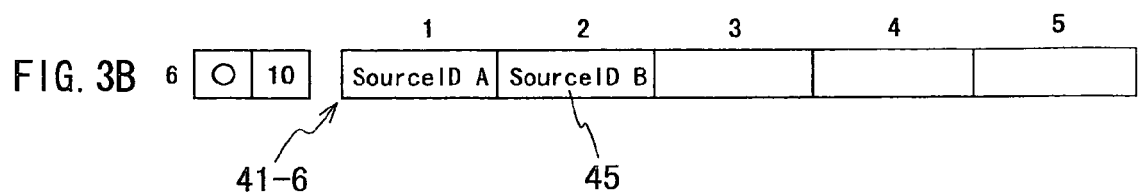

In such the case, the source IDs "A" and "B" are obtained from not only the EITs but also the VCTs. The source ID "A" corresponds to the channel 10-1, and the source ID "B" corresponds to the channel 10-2. The source IDs "A" and "B" are not allocated to the memory areas 45 on the source ID table 41-6. Thus, as shown in FIG. 3B, the source ID "A" is allocated to an area of the memory areas 45 corresponding to the channel 10-1, and the source ID "B" is allocated to an area of the memory areas 45 corresponding to the channel 10-2.

Figure 3C:
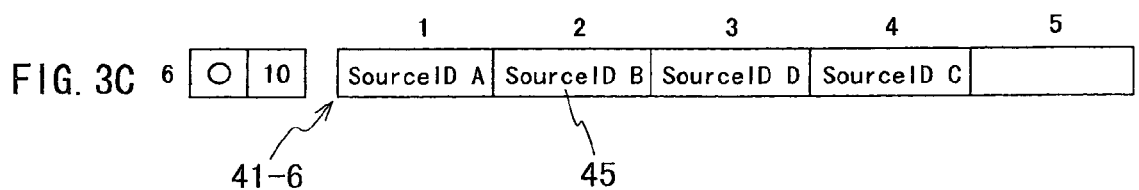

The source IDs "C" and "D" are obtained from the EITs but not from the VCTs. Furthermore, the source IDs "C" and "D" are not allocated to the memory areas 45 on the source ID table 41-6. Thus, the source IDs "C" and "D" are respectively allocated to areas of the memory area 45 on the source ID table 41-6 corresponding to the channels 10-3 and 10-4 which have the smallest channel numbers among the channels to which no source ID is allocated. Hereupon, the source IDs are allocated in series of earlier start times of the TV programs. In this example, as shown in FIG. 3C, the source ID "D" is allocated to an area of the memory areas 45 corresponding to the channel 10-3, and the source ID "C" is allocated to an area of the memory areas 45 corresponding to the channel 10-4. When the source IDs are designated by numerals, it is possible to allocate the source IDs to areas of the memory areas 45 corresponding to the channels having the smallest numbers in series of smaller numbers of the numerals designating the source IDs.

Figure 6:
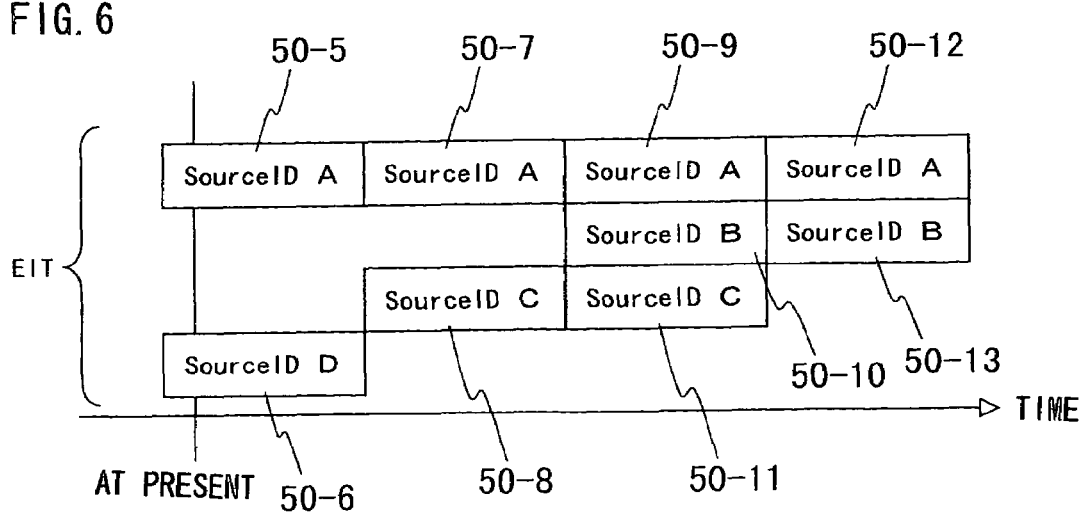
FIG. 6 is a drawing for showing other examples of EITs which are received by the digital/analogue TV receiver.
Figure 7:
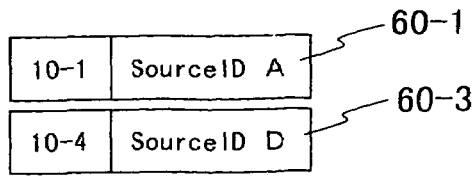
FIG. 7 is a drawing for showing other examples of VCTs which are received by the digital/analogue TV receiver.

It is assumed that nine EITs 50-5 to 50-12 are obtained at another time, as shown in FIG. 6. The source ID "A" is recorded in the EITs 50-5, 50-7, 50-9 and 50-12. The source ID "D" is recorded in the EIT 50-6. The source ID "C" is recorded in the EITs 50-8 and 50-11. The source ID "B" is recorded in the EITs 50-10 and 50-13. Simultaneously, two VCTs 60-1 and 60-3 are obtained, as shown in FIG. 7. In the VCT 60-1, it is recorded that the channel 10-1 corresponds to the source ID "A". In the VCT 60-3, it is recorded that a channel 10-4 (virtual channel "10" and sub-channel "4") corresponds to the source ID "D".

In such the case, the source ID "B" is obtained from the EITs but not from the VCTs. The source ID "B", however, is already allocated to the area of the memory areas 45 of the source ID table 41-6. The source ID "A" is obtained from both of the EITs and the VCTs, and corresponds to the channel 10-1. The source ID "A" is already allocated to the area of the memory areas 45 of the source ID table 41-6 corresponding to the channel 10-1. The source ID "C" obtained from the EITs but not from the VCTs is already allocated to the area of the memory areas 45 of the source ID table 41-6.

Figure 3D:
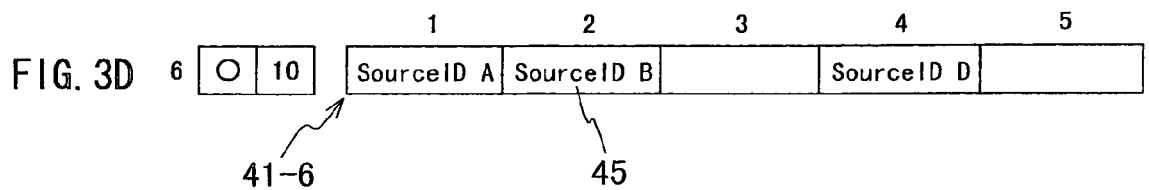
Figure 3E:
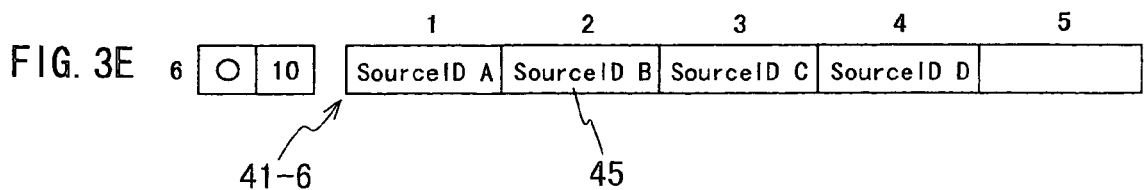

The source ID "D" is obtained from both of the EITs and the VCTs, and corresponds to the channel 10-4. The source ID "D", however, is already allocated to the area of the memory areas 45 of the source ID table 41-6 corresponding to the channel 10-3. In this embodiment, the correspondence between the source ID "D" and the channel 10-4 by the VCTs is given preference over the existing allocation. Thus, as shown in FIG. 3D, the source ID "D" is re-allocated to the area of the memory areas 45 of the source ID table 41-6 corresponding to the channel 10-4, and the allocation of the source ID "D" to the area of the memory areas 45 of the source ID table 41-6 corresponding to the channel 10-3 is canceled. Simultaneously, the source ID "C", which was allocated to the area of the memory areas 45 of the source ID table 41-6 corresponding to the channel 10-4, is re-allocated to the area of the memory areas 45 of the source ID table 41-6 corresponding to a channel having the smallest number (in this case, the channel 10-3) among the channels to which no source ID is allocated.

As mentioned above, the source IDs are allocated to the channel map with using the EITs and VCTs which are delivered from the TV stations. The above-mentioned explanation is described with respect to the virtual channel "10". The same can be applied to the other virtual channels. The allocation of the source IDs is executed at any time while the ATSC broadcast is received (including the cases that the TV program and the EPG screen are displayed on the display apparatus 30, and that the channel selection is operated).

Figure 8B:
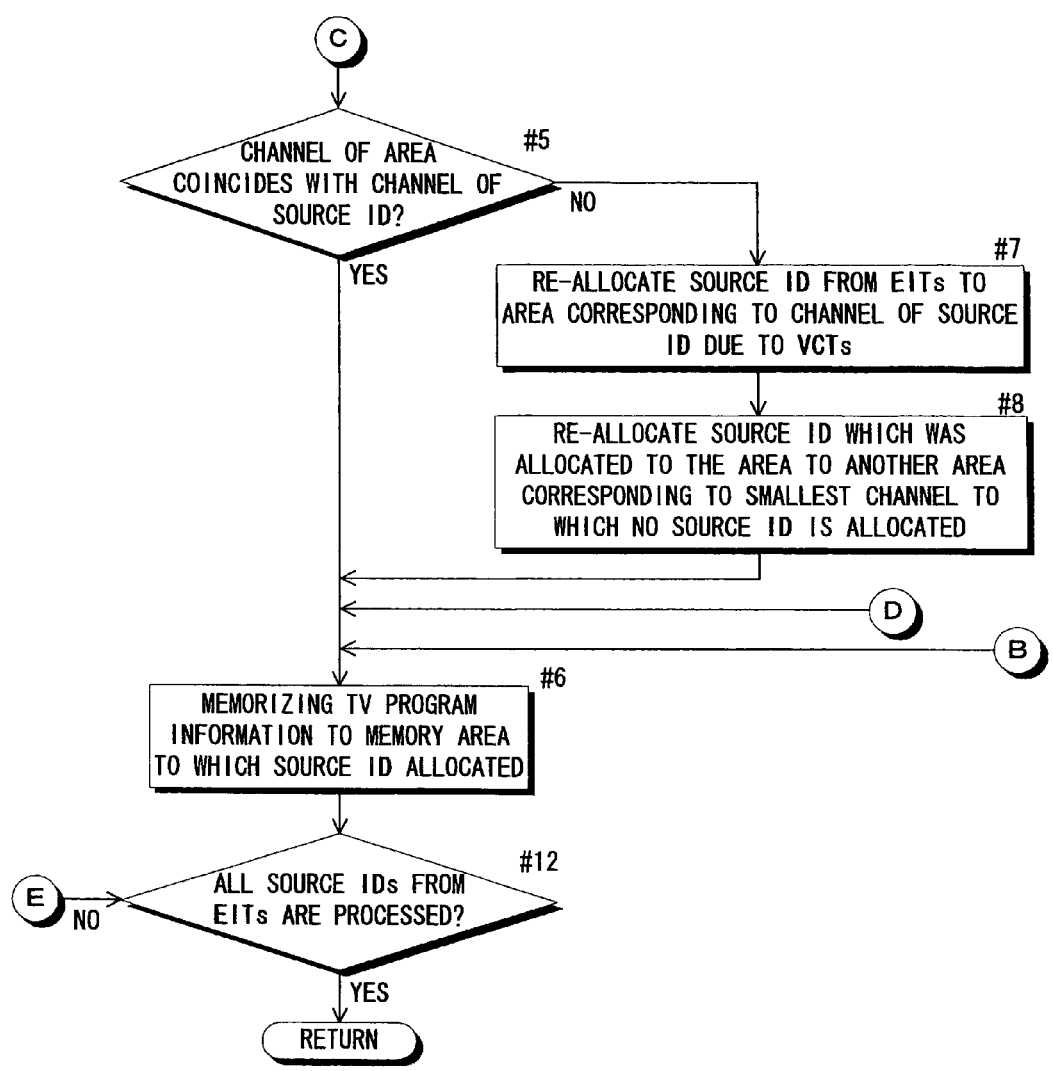
Figure 8C:
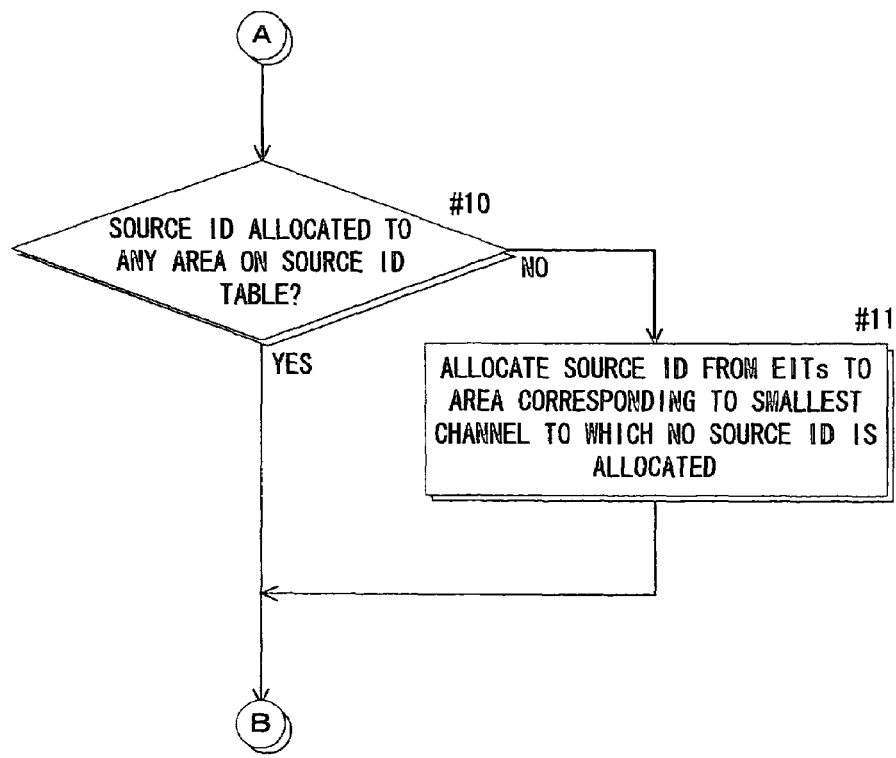
Figure 9:
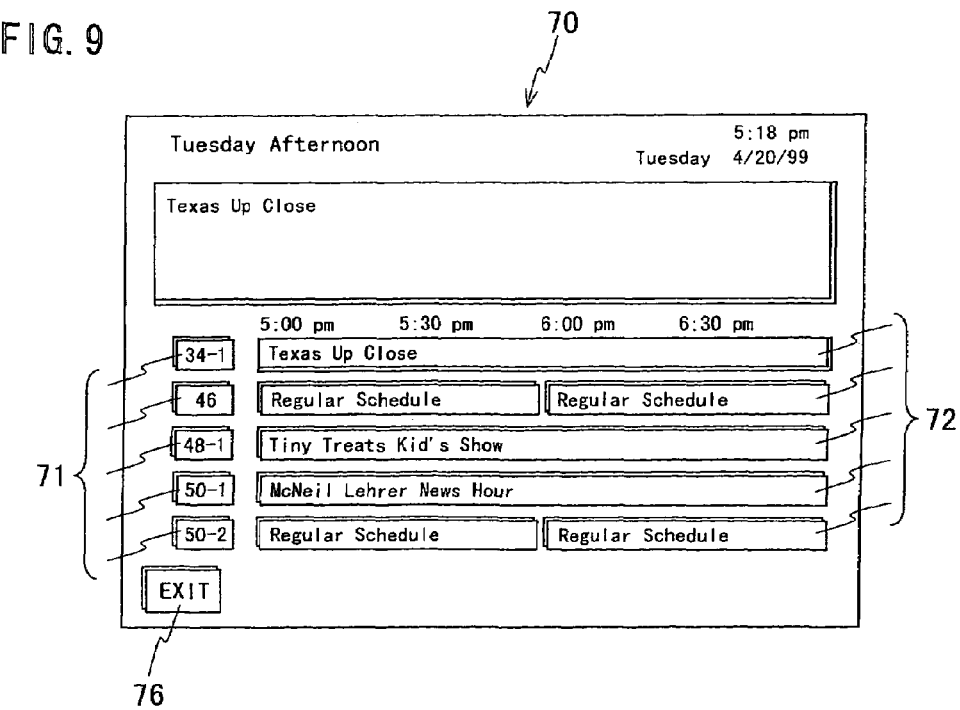
FIG. 9 is a drawing for showing an example of an EPG screen.

Subsequently, the operation of the TV receiver 1 in this embodiment is described with reference to flowcharts shown in FIGS. 8A to 8C. When the TV receiver 1 becomes active, the main controller 8 of the TV receiver 1 refers the EITs and the VCTs obtained from the TV broadcasting signals while the ATSC broadcast is received (#1), and judges whether the EITs and the VCTs are renewed or not (#2). When the EITs and VCTs are renewed (YES in step #2), the main controller 8 further judges whether a source ID obtained from the EITs can be obtained from the VCTs too or not with respect to each of the EITs obtained from the TV broadcasting signals (#3).

When the source ID can be obtained from the VCTs too (YES in step #3), the main controller 8 further judges whether the source ID is already allocated to any area of the memory areas 45 on the source ID table 41 or not (#4). When the source ID is already allocated to an area of the memory areas 45 (YES in step #4), the main controller 8 further judges whether the channel of the memory area 45 coincides with the channel corresponding to the source ID or not (#5).

When the channel of the memory area 45 to which the source ID is already allocated coincides with the channel corresponding to the source ID (YES in step #5), the allocation of the source ID had been completed, so that the main controller 8 memorizes the TV program information obtained from the EITs in the memory area 45 to which the source ID is allocated (#6).

Alternatively, when the channel of the memory area 45 to which the source ID is already allocated does not coincide with the channel corresponding to the source ID (NO in step #5), the main controller 8 re-allocates the source ID obtained from the EITs to the memory area 45 corresponding to the channel of the source ID due to the VCTs (#7). The source ID which was allocated to the area of the memory areas 45 is re-allocated to the area of the memory areas 45 corresponding to a channel having the smallest number among the channels to which no source ID is allocated (#8). The TV program information obtained from the EITs is memorized in the memory area 45 to which the source ID is allocated (#6).

In the above-mentioned step #4, when the source ID is not allocated to any area of the memory areas 45 (NO in step #4), the main controller 8 allocates the source ID obtained from the EITs to the memory area 45 corresponding to the channel of the source ID due to the VCTs (#9), and the TV program information obtained from the EITs is memorized in the memory area 45 to which the source ID is allocated (#6).

In the above-mentioned step #3, when the source ID obtained from the EITs cannot be obtained from the VCTs (NO in step #3), the main controller 8 judges whether the source ID is already allocated to any memory area 45 on the source ID table 41 or not (#10). When the source ID is already allocated to any memory area 45 (YES in step #10), the allocation of the source ID is maintained, and the TV program information obtained from the EITs is memorized in the memory area 45 to which the source ID is allocated (#6). Alternatively, when the source ID is not allocated to any memory area 45 (NO in step #10), the source ID obtained from the EITs is allocated to the area of the memory areas 45 corresponding to a channel having the smallest number among the channels to which no source ID is allocated (#11), and the TV program information obtained from the EITs is memorized in the memory area 45 to which the source ID is allocated (#6).

When the TV program information is memorized in the memory area 45 in step #6, the main controller 8 judges whether all the source IDs obtained from the EITs are processed or not (#12). When all the source IDs are not processed yet (NO in step #12), the main controller 8 repeats the above-mentioned steps from #3 to #12 with respect to next source ID. Alternatively, when all the source IDs are processed (YES in step #12), the main controller 8 repeats the steps from #1 to #12 while the ATSC broadcast has been received.

By the TV receiver 1 having the above-mentioned configuration, the TV program information obtained from the EITs included in the ATSC broadcasting signals is memorized in the channel map correspondingly to the channels of the TV programs and the TV program information memorized in the channel map is renewed, while the ATSC broadcast is received (including the cases that the TV program and the EPG screen are displayed on the display apparatus 30, and that the channel selection is operated). The source IDs corresponding to the channels are allocated to the channel map, and the TV program information obtained from the EITs are memorized in the channel map correspondingly to the channels based of the source IDs obtained from the EITs. When the operation for displaying the EPG screen is operated, the image of the EPG screen is formed with using the TV program information memorized in the channel map, and the EPG screen is displayed on the display apparatus 30.

The present invention is not restricted to the above-mentioned embodiments, but can be modified in various manners. For example, the EPG screen can automatically be displayed when the electric power source of the TV receiver 1 is switched on and starts to receive the analogous broadcast or the ATSC broadcast, or when the channel of the ATSC broadcast is selected and starts to receive the ATSC broadcast while the analogous broadcast is received.

This application is based on Japanese patent application 2002-005273 filed in Japan dated Jan. 11, 2002, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A digital/analogue TV receiver having a function for displaying an electric program guide (EPG) screen comprising:
a receiver receiving advanced television systems committee (ATSC) broadcasting signals of a physical channel that includes image information of a plurality of TV programs with virtual channel table (VCT) information showing relations between channels for the TV programs and source IDs which are added to respective of the channels, and event information table (EIT) information showing relations between TV program information of respective TV programs and the source IDs;
a decoder reproducing image signals of the TV programs from the ATSC broadcasting signals received by the receiver, outputting the image signals to a display apparatus which is connected to the TV receiver, and extracting the VCT information and the EIT information from the ATSC broadcasting signals;
a memory storing a channel map which memorizes the TV program information that includes EIT information and VCT information for the received physical channel and at least one other physical channel;
a controller renewing the channel map stored in the memory using the EIT information and the VCT information extracted by the decoder for the received physical channel, forming an EPG screen including at least the channels and the TV program information of respective of the TV programs of the received physical channel and at least one other physical channel based on the TV program information memorized in the channel map, and displays the EPG screen on the display apparatus; and
an operation device used for selecting a TV program to be seen, for displaying the selected TV program on the display apparatus, and for displaying the EPG screen on the display apparatus, wherein
the channel map has a plurality of memory areas corresponding to the channels;
the controller renews the channel map stored in the memory by allocating the source IDs to the memory areas using the EIT information and the VCT information, and memorizing the TV program information obtained from the EIT information in the memory areas to which the source IDs corresponding to the TV program information are allocated,
when a source ID obtained from the EIT information is also obtained from the VCT information, and when the source ID is not allocated to any area of the memory areas, the controller allocates the source ID to an area of the memory areas corresponding to a channel obtained from the VCT information;
when a source ID obtained from the EIT information is also obtained from the VCT information, and when the source ID is allocated to an area of the memory areas which is not corresponding to a channel obtained from the VCT information, the controller re-allocates the source ID to an area of the memory areas corresponding to the channel obtained from the VCT information; and
when a source ID obtained from the EIT information cannot be obtained from the VCT information, and when the source ID is not allocated to any area of the memory areas, the controller allocates the source ID to an area corresponding to a channel having the smallest number among the channels to which no source ID is allocated.

2. The digital/analogue TV receiver in accordance with claim 1, wherein
the controller renews the channel map stored in the memory by obtaining the EIT information and the VCT information for the received channel from the decoder while image signals of a TV program from the received physical channel are outputted to the display apparatus.

3. The digital/analogue TV receiver in accordance with claim 1, wherein
when the ATSC broadcasting signals are initially received, the controller forms the EPG screen with using the TV program information memorized in the channel map and displays the EPG screen on the display apparatus.

4. The digital/analogue TV receiver in accordance with claim 1, wherein
when an electric power source of the TV receiver is switched on, the controller forms the EPG screen with using the TV program information memorized in the channel map and displays the EPG screen on the display apparatus.

5. A method for a digital/analogue TV receiver having a function for displaying an electric program guide (EPG) screen, the method comprising the acts of:
- receiving advanced television systems committee (ATSC) broadcasting signals of a physical channel that includes virtual channel table (VCT) information showing relations between channels for TV programs and source IDs, and event information table (EIT) information showing relations between TV program information of respective TV programs and the source IDs;
- extracting the VCT and EIT information from the received physical channel;
- storing a channel map which memorizes the TV program information that includes EIT information and VCT information for the received physical channel and at least one other physical channel;
- renewing the channel map stored in the memory using the extracted EIT and VCT information of the received physical channel;
- forming an EPG screen including at least the channels and the TV program information of respective of the TV programs of the received physical channel and at least one other physical channel based on the TV program information memorized in the channel map; and
- displaying the EPG screen wherein
  - the channel map has a plurality of memory areas corresponding to the channels, and
  - the stored channel map is renewed by allocating the source IDs to the memory areas using the EIT and VCT information, and memorizing the TV program information obtained from the EIT information in the memory areas to which the source IDs corresponding to the TV program information are allocated,
  - when a source ID obtained from the EIT information is also obtained from the VCT information, and when the source ID is not allocated to any area of the memory areas, the source ID is allocated to an area of the memory areas corresponding to a channel obtained from the VCT information;
  - when a source ID obtained from the EIT information is also obtained from the VCT information, and when the source ID is allocated to an area of the memory areas which is not corresponding to a channel obtained from the VCT information, the source ID is reallocated to an area of the memory areas corresponding to the channel obtained from the VCT information; and
  - when a source ID obtained from the EIT information cannot be obtained from the VCT information, and when the source ID is not allocated to any area of the memory areas, the source ID is allocated to an area corresponding to a channel having the smallest number among the channels to which no source ID is allocated.

6. The method of claim 5, wherein the stored channel map is renewed by obtaining the EIT and VCT information of the received physical channel while image signals of a TV program from the received physical channel are outputted to a display apparatus.

7. The method of claim 5, wherein
when the ATSC broadcasting signals are initially received, the EPG screen is formed using the TV program information memorized in the channel map and the EPG screen is displayed.

8. The method of claim 5, wherein
when an electric power source of the TV receiver is switched on, the EPG screen is formed using the TV program information memorized in the channel map and the EPG screen is displayed.

* * * * *